Aug. 10, 1926.

W. L. ABBOTT ET AL 1,595,850

TRANSMISSION LOCKING DEVICE

Filed July 13, 1925    2 Sheets-Sheet 1

W. L. Abbott
A. C. Shafer
INVENTORS

BY Victor J. Evans
ATTORNEY

WITNESS:

Aug. 10, 1926. 1,595,850
W. L. ABBOTT ET AL
TRANSMISSION LOCKING DEVICE
Filed July 13, 1925  2 Sheets-Sheet 2
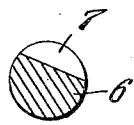
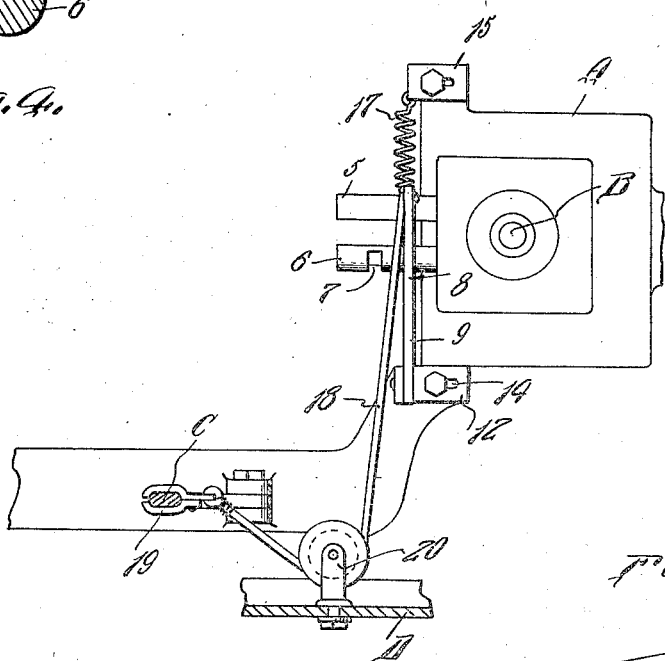
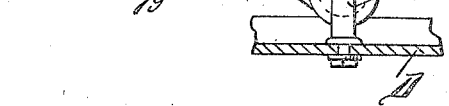
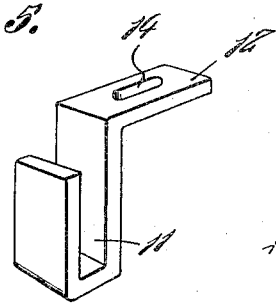
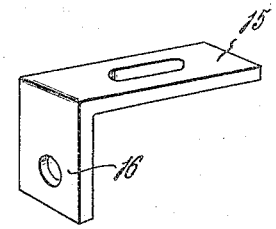
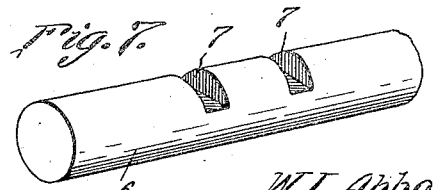
INVENTORS
W. L. Abbott
A. C. Shafer
BY Victor J. Evans
ATTORNEY Patented Aug. 10, 1926.

1,595,850

UNITED STATES PATENT OFFICE.

WINFIELD L. ABBOTT AND ARTHUR C. SHAFER, OF BROAD TOP, PENNSYLVANIA.

TRANSMISSION-LOCKING DEVICE.

Application filed July 13, 1925. Serial No. 43,358.

This invention has reference to a transmission locking device which is simple in construction, durable and efficient in use and one wherein the gears of the transmission are retained in mesh, in either second or third speed, during the travel of the automobile; and further from practical experience the invention has been found beneficial where the gears of the transmission have become worn or partially mutilated from long use of the automobile.

To this end, the invention contemplates providing a locking device of the above-stated character so constructed and installed for use whereby the movement of such is controlled by the operation of the clutch pedal.

A further object of the invention resides in the provision of a spring-pressed lever pivotally mounted on the transmission casing and contacting with the slots in the transmission shaft after the shifting of the gears from second and third speeds, and is adapted for positively retaining the gears in mesh at the desired speed after the starting of the motor vehicle.

A still further object exists in the provision of a flexible element employed for connecting the holding member for the transmission shafts with the clutch pedal thus causing movement of the lever solely through the operation of the clutch.

With the above and other objects in view, the invention further includes the following novel features and details of construction to be hereinafter more fully described, illustrated in the accompanying drawings, and pointed out in the appended claim.

In the drawings:—

Figure 3 is a plan view of the transmission casing illustrating the connection of the lever with the clutch pedal.

Figure 4 is a transverse sectional view taken through one of the transmission shafts.

Figure 5 is a perspective view of the bracket for mounting the lever on the transmission casing.

Figure 6 is a perspective view of the attaching plate.

Figure 7 is a perspective view of one end of one of the transmission shafts.

Referring more particularly to the accompanying drawings wherein like characters of reference denote similar parts, A denotes the transmission casing of an automobile, B the gear shaft lever therefor, C the clutch pedal and D one of the side sills of the automobile frame.

Figure 1:
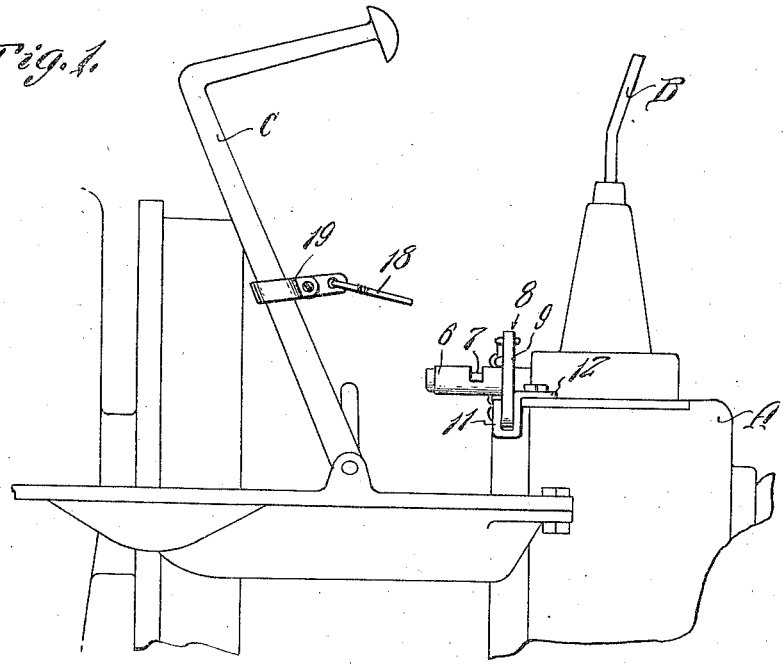
Figure 1 is a detail side elevation of the transmission casing illustrating in connection therewith and in side elevation the usual clutch pedal.
Figure 2:
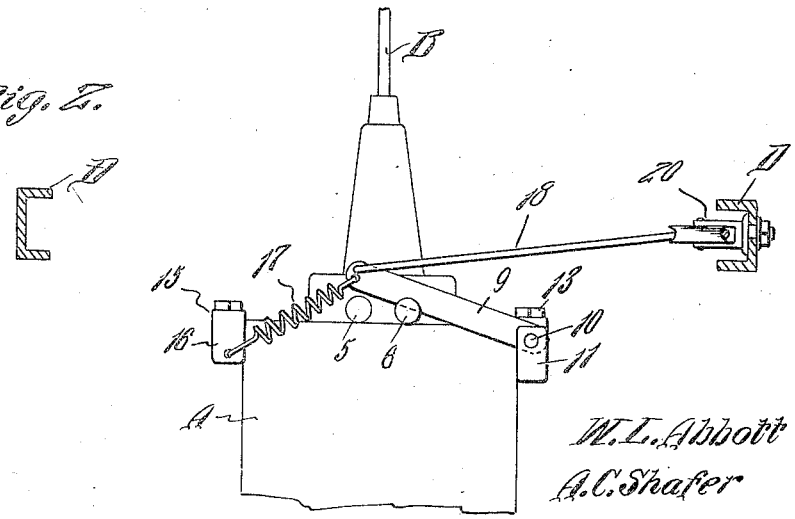
Figure 2 is an end view of the transmission casing illustrating the lever in engagement with the transmission shaft.

Furthermore for the sake of clearness there is illustrated the usual transmission shaft 5, employed for first speed and reverse, and 6 a further transmission shaft for the second and third speeds. The latter-mentioned transmission shaft; namely that indicated by the reference character 6, is provided with a pair of spaced transverse notches 7, the purpose of which will be more fully explained as the description of the invention is proceeded with. The transmission locking device denoted generally by the character 8 comprises an arm or lever 9 pivotally mounted as at 10 for horizontal rocking movement in the U-shaped portion 11 of the bracket 12. Suitable fastening means 13 passes through the elongated slot 14 of the U-shaped bracket and serves to attach to the transmission casing the bracket 11. Fastened to the opposite side of the transmission casing A is an L-shaped attaching plate 15 provided with a depending apertured lug 16 and in the aperture of the lug 16 is fastened one end of a coil spring 17, while the opposite end of this spring 17 has connection with the free end of the arm or lever 9. It will, therefore, be observed that through the tension of the spring 17 the arm 9 will at all times be positively retained in either of the slots 7 of the transmission shaft 6, after the gears of the transmission have been shifted to either second or third speed. It is to be further noted by this construction that after the gears have been shifted to either second or third speed, the spring will retain the lever 9 in the slots 7 of the transmission shaft 6 and prevent any disengagement of the gears from one another.

For conveniently releasing the engagement of the lever 9 from the transmission shafts and to freely expand the spring 17, use is made of a flexible connection 18, in the form of a cable, cord or the like and one end of the connecting member 9 is secured to the free end of the lever or arm 9, whereas the opposite end of the connecting member is clamped, as at 19, to the clutch operating pedal C. The connecting member 18 is held taut and prevented from having therein undue slack, by the provision of a pulley 20, and this pulley is secured to the inner face of the frame D of the vehicle.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

Having thus described the invention what is claimed is:—

In combination with a transmission having its shaft provided with spaced parallel slots and a clutch pedal of a locking means for said shaft comprising a bracket having a U-shaped portion and being secured to the housing of the transmission, a lever having one end pivoted in the U-shaped portion and formed with an opening in its opposite end, a lug secured to the housing of the transmission and being disposed in spaced parallel relation with the bracket, a coil spring having one end secured to the lug and its opposite end secured in the said opening of the lever to normally retain the lever in one of the slots of the shaft, and a guided flexible element having one end secured in the opening above mentioned and its opposite end secured to the clutch pedal whereby upon movement of the clutch pedal the lever will be swung in a vertical plane out of its slot.

In testimony whereof we affix our signatures.

WINFIELD L. ABBOTT.
ARTHUR C. SHAFER.